(12) United States Patent
Morita et al.

(10) Patent No.: US 9,780,377 B2
(45) Date of Patent: Oct. 3, 2017

(54) NON-AQUEOUS ELECTROLYTE SECONDARY BATTERY AND METHOD FOR PRODUCING SAME

(75) Inventors: Masahiro Morita, Nisshin (JP); Yutaka Oyama, Toyota (JP); Yukihiro Okada, Shijyonawate (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 567 days.

(21) Appl. No.: 14/374,343

(22) PCT Filed: Jan. 25, 2012

(86) PCT No.: PCT/JP2012/051577
§ 371 (c)(1),
(2), (4) Date: Sep. 22, 2014

(87) PCT Pub. No.: WO2013/111291
PCT Pub. Date: Aug. 1, 2013

(65) Prior Publication Data
US 2015/0004448 A1    Jan. 1, 2015

(51) Int. Cl.
| | |
|---|---|
| *H01M 4/62* | (2006.01) |
| *H01M 10/0565* | (2010.01) |
| *H01M 10/0567* | (2010.01) |
| *H01M 10/058* | (2010.01) |
| *C08G 61/02* | (2006.01) |
| *H01M 2/24* | (2006.01) |

(Continued)

(52) U.S. Cl.
CPC ............ *H01M 4/628* (2013.01); *C08G 61/02* (2013.01); *H01M 2/24* (2013.01); *H01M 2/345* (2013.01); *H01M 4/04* (2013.01); *H01M 4/62* (2013.01); *H01M 10/058* (2013.01); *H01M 10/0565* (2013.01); *H01M 10/0567* (2013.01); *H01M 10/4235* (2013.01); *H01M 2/34* (2013.01); *H01M 4/0471* (2013.01); *H01M 4/139* (2013.01); *H01M 10/052* (2013.01); *H01M 2200/20* (2013.01); *H01M 2220/20* (2013.01); *Y02E 60/122* (2013.01); *Y02P 70/54* (2015.11); *Y10T 29/49108* (2015.01)

(58) Field of Classification Search
CPC ............ H01M 4/628; H01M 10/0565; H01M 10/0567
USPC ......................................................... 429/61
See application file for complete search history.

(56) References Cited

U.S. PATENT DOCUMENTS

| | | | |
|---|---|---|---|
| 2010/0136435 A1 | 6/2010 | Yu et al. | |
| 2011/0189550 A1 | 8/2011 | Zhao et al. | |
| 2012/0142880 A1* | 6/2012 | Iwayasu | H01M 10/052 526/292.6 |

FOREIGN PATENT DOCUMENTS

| | | |
|---|---|---|
| CN | 102142585 A | 8/2011 |
| JP | 2006-073308 | 3/2006 |

(Continued)

*Primary Examiner* — Basia Ridley
*Assistant Examiner* — James Erwin
(74) *Attorney, Agent, or Firm* — Finnegan, Henderson, Farabow, Garrett & Dunner, LLP

(57) ABSTRACT

In the non-aqueous electrolyte secondary battery provided by the present invention, at or near the positive electrode constituting the non-aqueous electrolyte secondary battery, overcharge-reactive multimers including dimers to higher-order multimers formed by polymerization of an overcharge-reactive compound are present in a larger amount by mole than the overcharge-reactive compound remaining unpolymerized.

11 Claims, 3 Drawing Sheets

(51) Int. Cl.
*H01M 4/04* (2006.01)
*H01M 10/42* (2006.01)
H01M 2/34 (2006.01)
H01M 4/139 (2010.01)
H01M 10/052 (2010.01)

(56) References Cited

FOREIGN PATENT DOCUMENTS

| | | |
|---|---|---|
| JP | 2006-324235 | 11/2006 |
| KR | 10-2008-0101702 A | 11/2008 |
| KR | 10-2011-0090738 | 8/2011 |

* cited by examiner

[Fig. 4]

NON-AQUEOUS ELECTROLYTE SECONDARY BATTERY AND METHOD FOR PRODUCING SAME

CROSS-REFERENCE TO RELATED APPLICATIONS

This application is a national phase application of International Application No. PCT/JP2012/051577, filed Jan. 25, 2014, the content of which is incorporated herein by reference.

TECHNICAL FIELD

The present invention relates to a non-aqueous electrolyte secondary battery.

Background Art

Lately, lithium-ion secondary batteries and nickel-hydrogen batteries as well as other secondary batteries have become increasingly important as, for example, power supplies loaded on electrically-driven vehicles, or as power sources loaded on PCs, mobile phones and other electric products, etc. One type of structures of these batteries is, for example, a battery having an airtight configuration (sealed battery) obtainable by sealing positive and negative electrodes in a case. When this type of battery is subjected to charging, for instance, if the battery being charged has a defect, or if the charger fails and malfunctions, the battery may be supplied with an abnormally high amount of current, resulting in an overcharged state along with some newly formed defects. Thus, prevention of such defects calls for the use of a battery provided with a device (a current-interrupting device) that detects overcharged states by the internal temperature, pressure or the like, and interrupts current when an overcharged state is detected.

To provide such a current-interrupting device to a battery, a technique has been known to include, in its electrolyte solution, an overcharge-reactive compound such as cyclohexylbenzene (CHB) and biphenyl (BP), etc., having an oxidation potential lower than that of the non-aqueous solvent in the electrolyte solution. When the battery reaches an overcharged state, the compound reacts to generate gas before the electrolyte solution decomposes. By using this, the degree of increase or the increase rate of the internal pressure is enhanced to control the activation of the current-interrupting device when an overcharged state is reached. Literatures related to this type of conventional art include Patent Document 1.

CITATION LIST

Patent Literature

[Patent Document 1] Japanese Patent Application Publication No. 2006-324235

SUMMARY OF INVENTION

Technical Problem

For instance, however, during prolonged use of a battery or depending on the way of use of the battery (e.g. a way of use involving storage at high voltage), part of the compound such as CHB and BP may occasionally undergo modification or decomposition. In such a case, an intended amount of gas may not be generated when an overcharged state is reached, and normal activation of the current-interrupting device may not take place. In view of such an event, the compound is added in an increased amount or the design tolerance of the current-interrupting device (e.g. the gas pressure tolerance setting for the activation of the current-interrupting device) is adjusted. However, it may lead to deterioration of other properties (e.g. input/output performance) while it is also disadvantageous in terms of the cost. It has been required to stably generate a necessary amount of gas without these troubles.

Overcharge-reactive compounds such as CHB, BP, etc., have been used for other purposes besides as gas-generating agents in current-interrupting devices. For example, while the compounds react to generate gas in an overcharged state, they themselves undergo polymerization. By this means, the resulting polymers serve as resistors inside batteries. By taking advantage thereof, the polymers produced from the compounds are allowed to precipitate out to form membranes on positive electrode surfaces so that further overcharges are prevented for increased safety in overcharged states. Even in such applications, it is required to stably carry out polymerization of the compounds.

The present invention has been made to solve conventional problems as described above, with an objective thereof being to provide a non-aqueous electrolyte secondary battery capable of stably and highly precisely produce desirable effects obtainable by a reaction of the overcharge-reactive compound (e.g. generation of a necessary amount of gas and production of a polymer from the compound in an overcharged state). Another objective is to provide a method for producing a non-aqueous electrolyte secondary battery having such properties.

Solution to Problem

To achieve the objectives, the present invention provides a non-aqueous electrolyte secondary battery. In the non-aqueous electrolyte secondary battery, at or near the positive electrode constituting the non-aqueous electrolyte secondary battery, overcharge-reactive multimers including dimers to higher-order multimers formed by polymerization of an overcharge-reactive compound are present in a larger amount by mole than the overcharge-reactive compound remaining unpolymerized.

While the present inventors examined improvements in the precision and stability of polymerization reactions of overcharge-reactive compounds in non-aqueous electrolyte secondary batteries (e.g. reactions to generate gas or to produce polymers), they discovered that such a reaction occurs mainly in two steps. In particular, in the first step (or Step 1 hereinafter), an overcharge-reactive compound reacts (polymerizes) to produce overcharge-reactive multimers including dimers to higher-order multimers of the overcharge-reactive compound as an intermediate. Subsequently, in the second step (or Step 2 hereinafter), the overcharge-reactive multimers produced further react (polymerize) to produce a polymer. In Step 2, along with the polymerization, atoms forming a gaseous component are eliminated from the overcharge-reactive multimers, producing a large amount of gas. For instance, however, it is presumed that when the battery is used for a prolonged period or stored at high voltage, part of the overcharge-reactive compound undergoes modification or decomposition and the Step 1 reaction progresses insufficiently. In this case, generation of gas or production of the polymer may become insufficient in Step 2. Based on these studies, further examination was carried out. As a result, it was found out that by allowing the reaction of the overcharge-reactive compound to progress through Step 1 in advance, modification or decomposition of the overcharge-reactive compound could be prevented, making it possible to highly precisely and stably produce desirable effects obtainable by the reaction of the overcharge-reactive compound, whereby the present invention was completed. In the non-aqueous electrolyte secondary battery provided by the present invention, overcharge-reactive multimers including dimers to higher-order multimers formed by polymerization of an overcharge-reactive compound are present in a total amount by mole greater than the overcharge-reactive compound remaining unpolymerized at or near the a positive electrode. The overcharge-reactive compound remaining unpolymerized refers to an overcharge-reactive compound that has not undergone the Step 1 reaction (polymerization). As described above, by allowing the reaction of the overcharge-reactive compound to progress through Step 1 in advance, a significant amount of overcharge-reactive multimers are present at or near the positive electrode at the start of use of the battery. This prevents modification or decomposition of the overcharge-reactive compound. Also, when an overcharged state is reached, the Step 2 reaction readily progresses. Thus, the present invention can highly precisely and stably produce desirable effects obtainable by the reaction of the overcharge-reactive compound.

In a preferable embodiment of the non-aqueous electrolyte secondary battery disclosed herein, the overcharge-reactive multimers primarily comprise dimers to decamers of the overcharge-reactive compound. In other words, by carrying out the aforementioned Step 1 reaction in advance, at the start of use of the battery, a significant amount of dimers to decamers of the overcharge-reactive compound is present as intermediates at or near the positive electrode. This preferably prevents modification or decomposition of the overcharge-reactive compound. Also, when an overcharged state is reached, the Step 2 reaction readily progresses.

In a preferable embodiment of the non-aqueous electrolyte secondary battery disclosed herein, the positive electrode comprises a polymerization initiator. By the inclusion of the polymerization initiator in the positive electrode, a polymerization reaction (typically the Step 1 reaction) of the overcharge-reactive compound preferably takes place on the positive electrode surface.

In a preferable embodiment of the non-aqueous electrolyte secondary battery disclosed herein, the polymerization initiator is an azo-based polymerization initiator. The overcharge-reactive compound is preferably at least one species selected from a group consisting of branched-chain alkylbenzenes, cycloalkylbenzenes, biphenyls, terphenyls, diphenyl ethers and dibenzofurans.

In a preferable embodiment of the non-aqueous electrolyte secondary battery disclosed herein, the non-aqueous electrolyte secondary battery comprises the positive electrode, a negative electrode and a case to house these electrodes. The battery is constituted as a sealed battery wherein a conductive pathway is formed to allow conduction between at least one of the electrodes and an outer terminal exposed outside the case. The battery further comprises a current-interrupting device configured so that an increase in the internal pressure of the case will cut off the conduction pathway. In the non-aqueous electrolyte secondary battery, by means of the reaction of the overcharge-reactive compound, regardless of the battery condition (e.g. a battery condition such as after prolonged use) or way of use (e.g. a way of use involving storage at high voltage), a necessary amount of gas is generated highly precisely and stably when an overcharged state is reached. This yields an expected increase in the internal pressure of the battery case. Thus, in an embodiment comprising a current-interrupting device that is activated by an internal pressure increase inside the case, the current-interrupting device can be activated highly precisely and stably when an overcharged state is reached. Accordingly, it can be preferably applied to a sealed battery comprising the current-interrupting device.

The present invention provides a method for producing a non-aqueous electrolyte secondary battery. The production method comprises obtaining a positive electrode comprising a polymerization initiator, obtaining a non-aqueous electrolyte comprising an overcharge-reactive compound, supplying the non-aqueous electrolyte to the positive electrode, polymerizing the overcharge-reactive compound so that overcharge-reactive multimers including dimers to higher-order multimers are formed at or near the positive electrode. As described here, by allowing the reaction of the overcharge-reactive compound to progress through Step 1 in advance with the use of polymerization initiator, modification or decomposition of the overcharge-reactive compound is prevented. Also, when an overcharged state is reached, the Step 2 reaction readily progresses. Hence, the production method of the present invention can provide a non-aqueous electrolyte secondary battery capable of highly precisely and stably producing desirable effects obtainable by the reaction of the overcharge-reactive compound.

In a preferable embodiment of the production method disclosed herein, the overcharge-reactive multimers primarily comprise dimers to decamers of the overcharge-reactive compound. When the degree of polymerization of the overcharge-reactive multimers produced by the reaction (polymerization) increases excessively, the overcharge-reactive multimers may serve as resistors inside the battery. Thus, it is preferable to suppress the degree of polymerization to a low level. In other words, it is preferable to carry out the Step 1 reaction so that the overcharge-reactive multimers primarily comprise dimers to decamers of the overcharge-reactive compound. By this means, without decreasing the battery properties, modification or decomposition of the overcharge-reactive compound is prevented while the Step 2 reaction progresses readily when an overcharged state is reached.

In a preferable embodiment of the production method disclosed herein, after the non-aqueous electrolyte is supplied to the positive electrode, the non-aqueous electrolyte supplied is heated at a temperature of 50° C. to 100° C. to polymerize the overcharge-reactive compound. By this means, the Step 1 reaction is allowed to preferably progress and desirable overcharge-reactive multimers are likely to be formed.

In a preferable embodiment of the production method disclosed herein, as the polymerization initiator, an azo-based polymerization initiator is used. It is also preferable to use, as the overcharge-reactive compound, at least one species selected from a group consisting of branched-chain alkylbenzenes, cycloalkylbenzenes, biphenyls, terphenyls, diphenyl ethers and dibenzofurans.

A preferable embodiment of the production method disclosed herein comprises constructing a current-interrupting device such that when the internal pressure inside the case housing the positive electrode and a negative electrode is increased, the device cuts off a conduction pathway allowing conduction between at least one of the positive electrode and the negative electrode and an outer terminal exposed outside the case. With respect to the non-aqueous electrolyte secondary battery, by the reaction of the overcharge-reactive compound, a necessary amount of gas is generated highly precisely and stably when an overcharged state is reached, and thus, the internal pressure of the case will also increase as expected. Accordingly, it can be applied to a production method for a secondary battery comprising a current-interrupting device that is activated by an internal pressure increase inside the case as described above.

The present invention also provides a vehicle comprising a non-aqueous electrolyte secondary battery disclosed herein. Due to a change in the charge/discharge rates or an occasional occurrence of local high-rate input/output, a vehicle-driving battery may reach a state where an overcharge-reactive compound happens to decompose. Thus, such a non-aqueous electrolyte secondary battery can be preferably used as a power supply for a motor (electric motor) loaded on vehicles such as automobiles comprising electric motors, including hybrid automobiles, electric automobiles, and fuel-cell automobiles and the like.

EMBODIMENTS OF INVENTION

While referring to drawings, an embodiment of the present invention is described below. The dimensional relationships (of length, width, thickness, etc.) in each drawing do not represent actual dimensional relationships. Matters (e.g. constitution and manufacturing process of the electrode body comprising the positive electrode and the negative electrode, constitutions and manufacturing processes of the separator and the electrolyte solution, the shape, etc., of the battery (case), general techniques related to construction of the battery, etc.) necessary to practice this invention other than those specifically referred to in this description may be understood as design matters based on the conventional art in the pertinent field to a person of ordinary skills in the art.

A preferable embodiment of the non-aqueous electrolyte secondary battery disclosed herein is described with an example of a lithium-ion secondary battery while the application of the present invention is not to be limited to such a battery. For example, the present invention can be applied to a non-aqueous electrolyte secondary battery using other metal ions (e.g. sodium ions) instead of lithium ions as the charge carrier. The term "secondary battery" in the present description refers to a battery capable of charging and discharging repeatedly in general, and includes storage batteries (i.e. chemical cells) such as lithium-ion secondary batteries and the like as well as capacitors (i.e. physical cells) such as electric double-layer capacitors and the like. The term "lithium-ion secondary battery" in the present description refers to a secondary battery that uses lithium ions as electrolyte ions, and is charged and discharged by charge transfer associated with lithium ions between the positive and negative electrodes.

Figure 1:
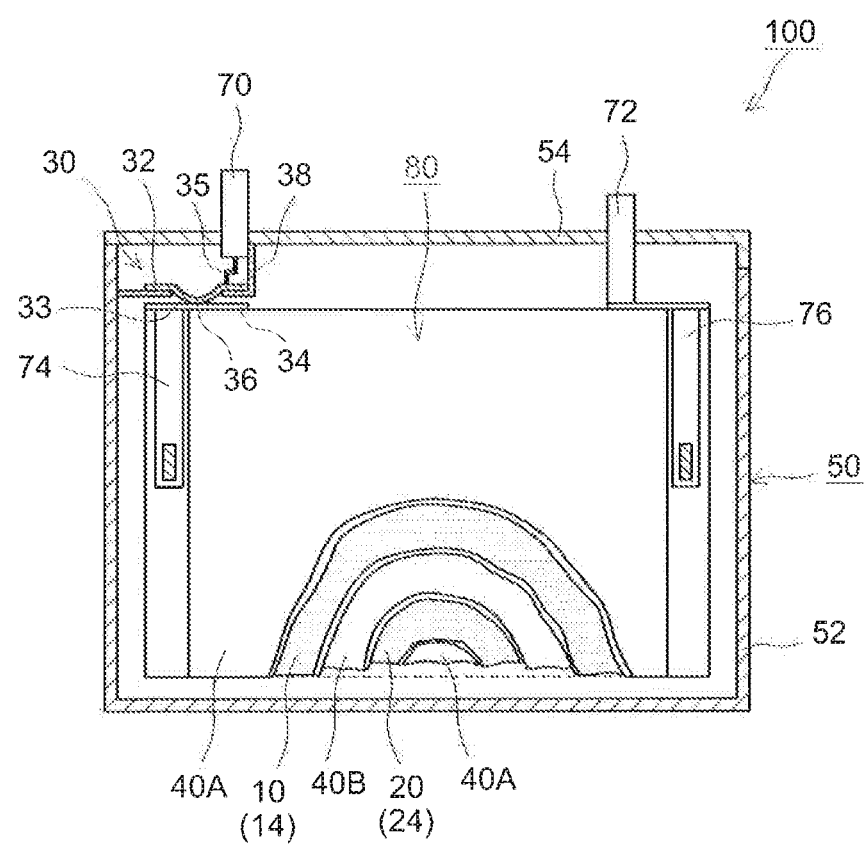
FIG. 1 shows a diagram schematically illustrating a lithium-ion secondary battery according to an embodiment.

As shown in FIG. 1, a lithium-ion secondary battery 100 according to an embodiment has a constitution such that a wound electrode body 80 is housed along with a non-aqueous electrolyte solution (not shown in the drawing) in a flat rectangular battery case 50. Wound electrode body 80 comprises a positive electrode (positive electrode sheet 10) and a negative electrode (negative electrode sheet 20) and has a construction such that positive electrode 10 and negative electrode 20 are wound via separators 40A and 40B in a flattened shape. It is noted that the electrode body is not limited to a wound electrode body. According to the shape and purpose of the battery, appropriate shape and construction can be suitably used.

Case 50 comprises a flat box-shape main casing 52 having an opening at the top and a lid 54 to close the opening. The upper face (lid 54) of case 50 is provided with a positive terminal 70 and a negative terminal 72. Positive terminal 70 is electrically connected to a positive current collector 74 provided at an edge across the width direction of positive electrode (positive electrode sheet) 10. Negative terminal 72 is electrically connected to a negative current collector 76 provided at an edge across the width direction of negative electrode (negative electrode sheet) 20.

Case 50 is internally provided with a current-interrupting device 30 which is activated by an increase in the internal pressure of case 50. Current-interrupting device 30 is provided between positive terminal 70 fixed on lid 54 and electrode body 80 and is constructed to electrically cut off a conduction pathway from positive terminal 70 to positive electrode 10 when the internal pressure of case 50 increases.

Current-interrupting device 30 may comprise, for instance, a first member 32 and a second member 34. It is constituted so that when the internal pressure of case 50 increases, at least one of the first member 32 and the second member 34 undergoes deformation to isolate itself from the other member and thereby to electrically cut off the conduction pathway. In this embodiment, the first member 32 is a shaped metal plate while the second member 34 is a metal connecting plate joined to the shaped metal plate 32. Shaped metal plate (first member) 32 has an arch curve portion 33 whose central portion is concave up. The periphery of curve portion 33 is connected via a current lead terminal 35 to the bottom of positive terminal 70. Part (a tip) of curve portion 33 of shaped metal plate 32 is joined via a junction 36 to the top of metal connecting plate 34. To the bottom (back face) of metal connecting plate 34, positive current collector 74 is joined while positive current collector 74 is connected to positive electrode 10 of wound electrode body 80. A conduction pathway from positive terminal 70 to positive electrode 10 is formed in such a way.

Current-interrupting device 30 comprises an insulating case 38 formed with a plastic. The material of the insulating case is not limited to plastics as far as it provides insulation while being nonporous. Insulating case 38 is provided to surround the shaped metal plate 32, sealing the top of shaped metal plate 32 airtight. Insulating case 38 has an opening in which curve portion 33 of shaped metal plate 32 is embedded. Curve portion 33 of shaped metal plate 32 seals the opening when embedded in the opening. By this, the interior of insulating case 38 is kept sealed off so that the internal pressure of case 50 does not act on the sealed top of the curve portion 33. On the contrary, the internal pressure of case 50 acts on the exterior of insulating case 38, that is, on the bare bottom of curved portion 33 inside case 50. In current-interrupting device 30 having such a constitution, with increasing internal pressure of case 50, the internal pressure acts in such a way to push up the concave up curve portion 33. This action (force) increases as the internal pressure of case 50 increases. When the internal pressure of case 50 increases above the preset pressure, curve portion 33 is reversed, undergoing deformation to be concave down. Such deformation of curve portion 33 cuts off the junction 36 between shaped metal plate 32 and metal connecting plate 34. This electrically cuts off the conduction pathway, whereby electric current is interrupted.

The current-interrupting device is not limited to the positive terminal side, but can also be provided on the negative terminal side. It should be constituted just so that the conduction pathway (e.g. charging path) between at least one of the positive and negative electrodes and an outer terminal (positive or negative terminal) exposed outside the case can be electrically cut off, and it is not limited to a particular shape or structure. The current-interrupting device is not limited to mechanical cut-off accompanying a deformation of the first member described earlier. For example, it is possible to provide, as the current-interrupting device, an external circuit that detects the internal pressure of the case with a sensor and interrupts a charging current when the internal pressure detected by the sensor increases above the preset pressure. When an overcharge-reactive compound is used for a purpose other than to generate gas as described later, the current-interrupting device is not necessary.

Figure 2:
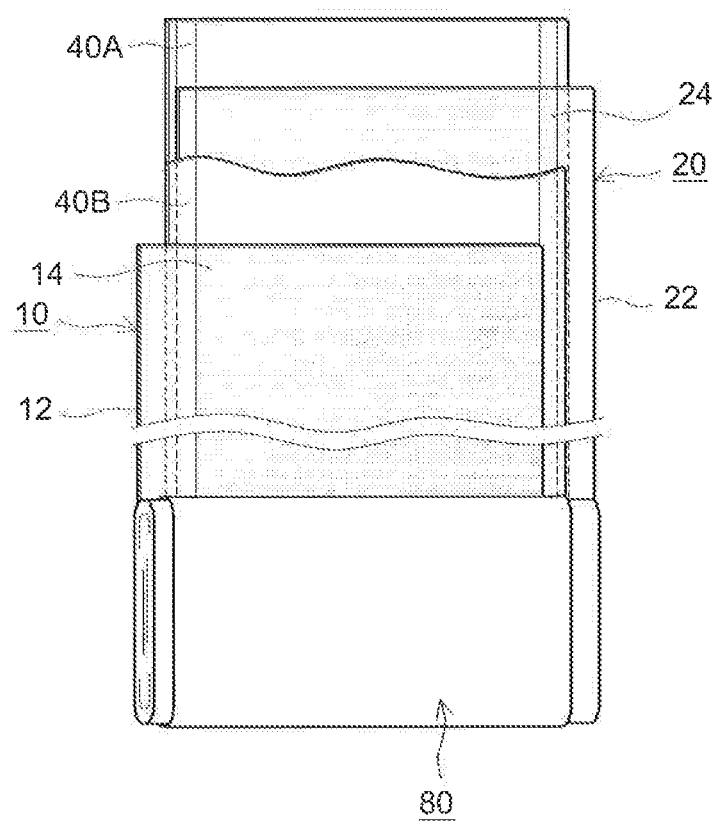
FIG. 2 shows a diagram schematically illustrating a constitution of a wound electrode body.

FIG. 2 shows a drawing schematically illustrating the constitution of the wound electrode body in FIG. 1, showing a long sheet structure (electrode sheets) at a stage before wound electrode body 80 is constructed. As shown in FIG. 2, wound electrode body 80 comprises a long positive electrode sheet 10 and a long negative electrode sheet 20. Positive electrode sheet 10 comprises a long length of positive current collector 12 and a positive electrode material layer 14 formed along the length direction on at least one (typically each) surface of positive current collector 12. Negative electrode sheet 20 comprises a long length of negative current collector 22 and a negative electrode material layer 24 formed along the length direction on at least one (typically each) surface of negative current collector 22. These positive electrode sheet 10 and negative electrode sheet 20 are overlaid via two long sheets of separator 40A and 40B, thereby forming a layered body. In other words, the layered body has positive electrode sheet 10, separator 40B, negative electrode sheet 20 and separator 40A layered in this order. By winding the layered body in the length direction, a wound electrode body is formed. Further by laterally compressing and flattening out the wound electrode body, a flat wound electrode body 80 is obtained.

The resulting wound electrode body 80 is placed in case 50, and the opening of main casing 52 is closed with lid 54 and sealed. A non-aqueous electrolyte is also poured (injected) into case 50. A so-called sealed lithium-ion secondary battery 100 is thus constructed, having a structure in which the interior of case 50 is sealed.

The respective components constituting the lithium-ion secondary battery are described next. As the positive current collector constituting the positive electrode (typically a positive electrode sheet) in the lithium-ion secondary battery, a conductive material formed of a metal having good conductivity can be preferably used. For example, can be used aluminum or an alloy containing aluminum as the primary component. The shape of positive current collector is not particularly limited as it may vary depending on the shape, etc., of the battery, and may have a variety of shapes such as a rod, plate, sheet, foil, mesh, and so on. The thickness of positive current collector is not particularly limited, either, and can be, for instance, 5 μm to 30 μm. The positive electrode material layer may comprise, in addition to a positive electrode active material, additives such as a conductive material, binder, etc., as necessary. While the positive electrode material layer may comprise a polymerization initiator, this feature is described later.

Examples of positive electrode active materials include a composite oxide comprising lithium and at least one species of transition metal (preferably at least one species among nickel, cobalt and manganese). Examples of the composite oxide include a so-called one-transition-metal lithium-containing composite oxide which comprises one species of transition metal, a so-called two-transition-metal lithium-containing composite oxide which comprises two species of transition metal, a three-transition-metal lithium-containing composite oxide which comprises nickel, cobalt and manganese as transition metals and a solid solution-type lithium-rich transition metal oxide. These can be used singly as one species or in combination of two or more species. Examples of the one-transition-metal lithium-containing composite oxide include lithium cobalt composite oxide ($LiCoO_2$), lithium nickel composite oxide ($LiNiO_2$) and lithium manganese composite oxide ($LiMn_2O_4$). Examples of the two-transition-metal lithium-containing composite oxide include two-transition-metal lithium-containing composite oxides represented by nickel/cobalt-based $LiNi_xCo_{1-x}O_2$ ($0<x<1$), cobalt/manganese-based $LiCo_xMn_{1-x}O_2$ ($0<x<1$), nickel/manganese-based $LiNi_xMn_{1-x}O_2$ ($0<x<1$) and $LiNi_xMn_{2-x}O_4$ ($0<x<2$). Examples of the three-transition-metal lithium-containing composite oxide include three-transition-metal lithium-containing composite oxides represented by a general formula:

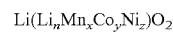

$$Li(Li_aMn_xCo_yNi_z)O_2$$

(in the formula, a, x, y, z are real numbers that satisfy $a+x+y+z=1$). Examples of the solid solution-type lithium-rich transition metal oxide include solid solution-type lithium-rich transition metal oxides represented by a general formula:

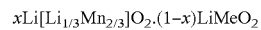

$$xLi[Li_{1/3}Mn_{2/3}]O_2 \cdot (1-x)LiMeO_2$$

(in the formula, Me is one, two or more species of transition metal, and x satisfies $0<x\le1$). In particular, a three-transition-metal lithium-containing composite oxide comprising nickel, cobalt and manganese as transition metals is preferable.

As the positive electrode active material, it is also preferable to use a polyanion-based compound represented by a general formula $LiMAO_4$ (herein, M is at least one species of metal selected from a group consisting of Fe, Co, Ni and Mn while A is an atom selected from a group consisting of P, Si, S and V). Those with A in the general formula being P and/or Si (e.g. $LiFePO_4$, $LiFeSiO_4$, $LiCoPO_4$, $LiCoSiO_4$, $LiFe_{0.5}Co_{0.5}PO_4$, $LiFe_{0.5}Co_{0.5}SiO_4$, $LiMnPO_4$, $LiMnSiO_4$, $LiNiPO_4$, $LiNiSiO_4$) are preferable examples of the polyanion-based compound.

The amount of positive electrode active material contained in the positive electrode material layer is greater than about 50% by mass, or preferably about 70% by mass to 95% by mass (e.g. 75% by mass to 90% by mass).

As the conductive material, a conductive powdery material such as carbon powder and carbon fiber are preferably used. Preferable examples of carbon powder include various kinds of carbon black, such as acetylene black, furnace black, Ketjen black, graphite powder and the like. Alternatively, among conductive fiber species such as carbon fiber, metal fiber, etc., and powdered metals such as copper, nickel, etc., and organic conductive materials such as polyphenylene derivatives, etc., and the like, solely one species or a mixture of two or more species can be contained. The binder can be various polymer materials. For example, when the positive electrode material layer is formed with an aqueous composition (a composition using water or a solvent mixture primarily comprising water as the dispersion medium for active material particles), a polymer material soluble or dispersible in water can be preferably used as the binder. Examples of water-soluble polymer materials include cellulose-based polymers such as carboxymethyl cellulose (CMC), etc.; polyvinyl alcohol (PVA); and the like. Examples of water-dispersible polymer materials include fluorine-based resins such as polytetrafluoroethylene (PTFE), etc.; vinyl acetate polymers; rubbers such as styrene butadiene rubber (SBR) and acrylic acid-modified SBR resin (SBR-based latex), etc. Alternatively, when the positive electrode material layer is formed with a solvent-based composition (a composition primarily using an organic solvent as the dispersion medium for active material particles), polymer materials such as halogenated vinyl resins including polyvinylidene fluoride (PVDF), polyvinylidene chloride (PVDC), etc.; polyalkylene oxide such as polyethylene oxide (PEO), etc.; and the like can be used. These binders can be used singly as one species or in combination of two or more species. The polymer materials exemplified above may be used also as thickeners or other additives in the positive electrode material layer-forming composition, besides being used as the binder.

The amounts of these additives contained in the positive electrode material layer are not particularly limited. The amount of conductive material is preferably about 4% by mass to 20% by mass (e.g. 4% by mass to 18% by mass) while the amount of binder is preferably about 1% by mass to 10% by mass (e.g. 1% by mass to 7% by mass).

The method for fabricating the positive electrode as described above is not particularly limited, and a conventional method can be suitably employed. For instance, it can be fabricated by the following method. Firstly, a positive electrode active material and a polymerization initiator described later as well as a conductive material and a binder, etc., as necessary are mixed with a suitable solvent (an aqueous solvent, a non-aqueous solvent, or a mixture of these) to prepare a pasty or slurry positive electrode material layer-forming composition (or a pasty composition, hereinafter). The mixing procedure can be carried out, using a suitable mixer (a planetary mixer, homodisper, clearmix, filmix, etc.). As the solvent used for preparation of the pasty composition, either an aqueous solvent or a non-aqueous solvent can be used. The aqueous solvent should just show aqueous properties, and water or a solvent mixture primarily comprising water can be preferably used. Preferable examples of non-aqueous solvents include N-methyl-2-pyrrolidone (NMP), methyl ethyl ketone, toluene, etc. The pasty composition thus prepared is applied to a positive current collector, allowed to dry by evaporating the solvent, and pressed. As a method for applying the pasty composition to the positive current collector, can be suitably employed a technique similar to conventionally-known methods. For example, with a suitable applicator such as slit coater, die coater, gravure coater, comma coater, etc., the composition can be preferably applied to the positive current collector. The solvent can be dried off well by employing one or a combination of natural drying, heated air, low-humidity air, vacuum, infrared rays, far-infrared rays and electron beam. As a pressing method, can be employed a compression method such as a conventionally-known roll-pressing method or a flat-press method, etc. To adjust the thickness, the thickness can be measured with a film thickness gauge and compressed several times to a desirable thickness by adjusting the pressure. A positive electrode can be thus obtained having a positive electrode material layer formed on the positive current collector.

For example, in the positive electrode fabricated as described above, the amount of the positive electrode material layer applied per unit area of the positive current collector (the coating weight of the positive electrode material layer-forming composition based on non-volatiles) is not particularly limited. From the standpoint of surely obtaining a sufficient conduction pathway (conduction path), the total for both faces of positive current collector is 6 $mg/cm^2$ or more (e.g. 12 $mg/cm^2$ or more, typically 15 $mg/cm^2$ or more), but preferably 90 $mg/cm^2$ or less (e.g. 45 $mg/cm^2$ or less, typically 35 $mg/cm^2$ or less).

As the negative current collector constituting the negative electrode (typically a negative electrode sheet), similarly to conventional lithium-ion secondary batteries, a conductive material formed of a metal having good conductivity can be preferably used. For instance, copper or an alloy containing copper as the primary component can be used. The shape of negative current collector is not particularly limited as it may vary in accordance with the shape, etc., of the battery, and it may have a variety of shapes such as a rod, plate, sheet, foil, mesh, and so on. The thickness of negative current collector is not particularly limited and can be, for instance, 5 μm to 30 μm.

The negative electrode material layer comprises a negative electrode active material capable of storing and releasing lithium ions serving as the charge carrier. The negative electrode active material is not particularly limited in terms of the composition or the form, and among substances conventionally used in lithium-ion secondary batteries, one, two or more species can be used. Examples of such negative electrode active materials include carbon materials used in typical lithium-ion secondary batteries. Examples of typical carbon materials used as negative electrode active materials include graphite carbons (graphites) and amorphous carbons, etc. In particular, it is preferable to use a granular carbon material (carbon powder) containing a graphite structure (layered structure) at least partially. Any carbon material among so-called graphitic substances (graphites), hard-to-graphitize carbonaceous substances (hard carbons), easy-to-graphitize carbonaceous substances (soft carbons) and substances having a structure combining these can be preferably used. Among these, use of a carbon material primarily comprising natural graphite (or synthetic graphite) is preferable. Such natural graphite (or synthetic graphite) may be obtained via spheronization of graphite flakes. For example, for the granular graphite comprising the spheronized graphite, it is preferable to have a median diameter (average particle diameter $D_{50}$: 50% volume-average particle diameter) in a range of about 5 μm to 30 μm when determined from a particle size distribution measured with a particle size analyzer based on laser scattering/diffraction. Alternatively, carbonaceous powder obtained by coating surfaces of the graphite with amorphous carbon can be used as well. Other than these, as the negative electrode active material, can also be used an oxide such as lithium titanate or the like, a silicon material, a tin material, etc., as a single species, an alloy, a compound, or a composite material combining these materials. The amount of negative electrode active material contained in the negative electrode material layer is greater than about 50% by mass, or preferably about 90% by mass to 99% by mass (e.g. 95% by mass to 99% by mass, typically 97% by mass to 99% by mass).

The positive electrode material layer may comprise, as necessary, one, two or more species among binders, thickeners and other additives that can be used in negative electrode material layers in general lithium-ion secondary batteries. The binder can be various polymer materials. For example, when forming the negative electrode material layer with an aqueous composition (a composition using water or a solvent mixture primarily comprising water as the dispersion medium for active material particles), a polymer material soluble or dispersible in water can be preferably used as the binder. Examples of water-soluble polymer materials include cellulose-based polymers such as carboxymethyl cellulose (CMC), methyl cellulose (MC), cellulose acetate phthalate (CAP), hydroxypropyl methylcellulose (HPMC), hydroxypropyl methylcellulose phthalate (HPMCP), etc.; polyvinyl alcohol (PVA); and the like. Examples of water-dispersible polymer materials include fluorine-based resins such as polytetrafluoroethylene (PTFE), tetrafluoroethylene-perfluoroalkyl vinyl ether copolymers (PFA), tetrafluoroethylene-hexafluoropropylene copolymers (FEP), ethylene-tetrafluoroethylene copolymers (ETFE), etc.; vinyl acetate polymers; rubbers such as styrene-butadiene rubber (SBR), acrylic acid-modified SBR resins (SBR-based latexes), gum arabic, etc.; and the like. Alternatively, when forming the negative electrode active layer with a solvent-based composition (a composition primarily using an organic solvent as the dispersion medium for the active material particles), can be used a polymer material such as polyvinylidene fluoride (PVDF), polyvinylidene chloride (PVDC), polyethylene oxide (PEO), polypropylene oxide (PPO), polyethylene oxide-propylene oxide copolymers (PEO-PPO), etc. The polymer materials exemplified above may also be used as thickeners or other additives in the negative electrode material layer-forming composition, besides being used as binders. The amounts of these additives contained in the negative electrode material layer are not particularly limited while they preferably account for about 1% by mass to 10% by mass (e.g. about 1% by mass to 5% by mass, typically 1% by mass to 3% by mass).

The method for fabricating the negative electrode as described above is not particularly limited, and a conventional method can be suitably employed. For instance, it can be fabricated by the following method. Firstly, a negative electrode active material along with a binder, etc., are mixed with the suitable solvent (an aqueous solvent, a non-aqueous solvent, or a mixture of these) to prepare a pasty or slurry negative electrode material layer-forming composition (or a pasty composition, hereinafter). The pasty composition thus prepared is applied to a negative current collector, allowed to dry by evaporating the solvent, and pressed. A negative electrode can be thus obtained, comprising a negative electrode material layer formed with the pasty composition on the negative current collector. As the methods for mixing, applying and pressing the composition, similarly to the production method for the positive electrode described above, conventional means can be used.

For example, in the negative electrode fabricated as described above, the amount of the negative electrode material layer applied per unit area of the negative current collector (the coating weight of the negative electrode material layer-forming composition based on non-volatiles) is not particularly limited. From the standpoint of surely obtaining a sufficient conduction pathway (conduction path), the total for both faces of negative current collector is 2.5 mg/cm$^2$ or more (e.g. 6 mg/cm$^2$ or more, typically 10 mg/cm$^2$ or more), but preferably 45 mg/cm$^2$ or less (e.g. 22 mg/cm$^2$ or less, typically 15 mg/cm$^2$ or less).

The separator (separator sheet) placed so as to separate the positive electrode and negative electrode should just be a material that insulates the positive electrode material layer and negative electrode material layer while allowing transport of the electrolyte. Preferable examples of the separator include a separator formed with a porous polyolefin-based resin. For example, can be preferably used an approximately 5 μm to 30 μm thick porous separator sheet made of a synthetic resin (e.g. polyethylene, polypropylene, or a polyolefin having a constitution combining two or more layers of these). The separator sheet may be provided with a heat-resistant layer. Alternatively, for instance, a heat-resistant layer may be constituted with a layer of insulating particles formed on the surface of the positive electrode material layer or negative electrode material layer. Herein, the insulating particles can be insulating inorganic fillers (e.g. fillers formed of metal oxides, metal hydroxides, etc.) or insulating resin particles (e.g. particles of polyethylene, polypropylene, etc.). For instance, when a solid-form (gel-form) electrolyte is used in place of a liquid-form electrolyte, the electrolyte may serve as the separator so that another separator may not be necessary.

For the non-aqueous solvent and supporting salt constituting the non-aqueous electrolyte inserted into the lithium-ion secondary battery, species conventionally used in lithium-ion secondary batteries can be used without particular limitations. Such a non-aqueous electrolyte is typically an electrolyte solution having a composition containing a supporting salt in a suitable non-aqueous solvent. Examples of the non-aqueous solvent include ethylene carbonate (EC), propylene carbonate (PC), diethyl carbonate (DEC), dimethyl carbonate (DMC), ethyl methyl carbonate (EMC), 1,2-dimethoxyethane, 1,2-diethoxyethane, tetrahydrofuran, 2-methyltetrahydrofuran, dioxane, 1,3-dioxolane, diethylene glycol dimethyl ether, ethylene glycol dimethyl ether, acetonitrile, propionitrile, nitromethane, N,N-dimethylformamide, dimethylsulfoxide, sulfolane, γ-butyrolactone, etc., among which solely one species or a mixture of two or more species can be used. In particular, a solvent mixture of ethylene carbonate (EC), dimethyl carbonate (DMC) and ethyl methyl carbonate (FMC) is preferable.

As the supporting salt, for example, can be used one, two or more species of lithium compounds (lithium salts) among LiPF$_6$, LiBF$_4$, LiClO$_4$, LiAsF$_6$, LiCF$_3$SO$_3$, LiC$_4$F$_9$S$_3$, LiN(CF$_3$SO$_2$)$_2$, LiC(CF$_3$SO$_2$)$_3$, LiI and the like. The supporting salt concentration is not particularly limited while it can be about 0.1 mol/L to 5 mol/L (e.g. 0.5 mol/L to 3 mol/L, typically 0.8 mol/L to 1.5 mol/L).

The non-aqueous electrolyte comprises an overcharge-reactive compound. Herein, the term overcharge-reactive compound refers to a compound that is soluble or dispersible in the non-aqueous electrolyte and capable of undergoing mutual reaction (polymerization) when the battery reaches an overcharged state. While such an overcharge-reactive compound is not oxidized at the operating voltage of the battery, once an overcharged state is reached, it will undergo a reaction (oxidation) before the non-aqueous solvent of the non-aqueous electrolyte undergoes oxidative decomposition. Thus, the oxidation potential (the potential at which oxidation starts) of the overcharge-reactive compound is higher than the upper voltage limit for the positive electrode, which corresponds to the maximum value of the operating voltage. In contrast, it is lower than the oxidation potential (the potential at which oxidation starts) of the non-aqueous solvent of the non-aqueous electrolyte. From this standpoint, the oxidation potential (vs. Li/Li⁺) of the overcharge-reactive compound is preferably higher by 0.1 V or more (e.g. 0.2 V or more, typically 0.3 V or more) than the upper voltage limit (vs. Li/Li⁺) for the positive electrode. It is preferably lower by 0.1 V or more (e.g. 0.2 V or more, typically 0.3 V or more) than the oxidation potential (vs. Li/Li⁺) of the non-aqueous solvent. For example, in a secondary battery with an upper voltage limit for the positive electrode of 4.2 V or lower (typically 4.0 V to 4.2 V), a preferable range of oxidation potential of the overcharge-reactive compound is 4.3 V or higher (e.g. 4.4 V or higher, typically 4.5 V or higher), but 5.0 V or lower (e.g. 4.9 V or lower, typically 4.8 V or lower).

It is preferable that the overcharge-reactive compound is a compound having a benzene ring with at least one of the benzene-ring-constituting carbons being bonded to a tertiary carbon. Since such a tertiary carbon is highly active, an overcharge-reactive compound having the tertiary carbon is reactive in an overcharged state. The number of tertiary carbons bonded to carbons constituting the benzene ring is preferably one to three (e.g. one to two, typically one). It is also preferable that the group having the tertiary carbon is a phenyl group, cycloalkyl group with 3 to 6 carbons (carbon atoms), branched-chain alkyl group with 3 to 6 carbons.

The molecular weight of the overcharge-reactive compound is not particularly limited. From the standpoint of the solubility (dispersibility) to the non-aqueous electrolyte, etc., it is preferably 100 to 400 (e.g. 120 to 250, typically 150 to 200).

Preferable examples of overcharge-reactive compounds include branched-chain alkylbenzenes, cycloalkylbenzenes, biphenyls, terphenyls, diphenyl ethers and dibenzofurans. These can be used singly as one species or in combination of two or more species. In particular, because of their high reactivities in overcharged states and ease of control for polymerization reactions, branched-chain alkylbenzenes, cycloalkylbenzenes, biphenyls and diphenyl ethers are preferable, with cycloalkylbenzenes and biphenyls being more preferable.

Examples of branched-chain alkylbenzenes include a branched-chain alkylbenzene having a branched-chain alkyl group with 3 to 6 carbons and a halogenated (typically fluorinated) branched-chain alkylbenzene. The number of branched-chain alkyl groups with 3 to 6 carbons is preferably one or two. The halogenated (typically fluorinated) branched-chain alkylbenzene refers to a compound in which at least one of the hydrogen atoms bonded to the carbon atoms constituting the branched-chain alkylbenzene is substituted with a halogen atom (typically a fluorine atom). From the standpoint of generating gas (typically hydrogen gas), it is preferably a partially-fluorinated branched chain alkylbenzene in which one or two of the hydrogen atoms bonded to the carbon atoms constituting the branched-chain alkylbenzene are substituted with fluorine atom(s).

Specific examples of branched-chain alkylbenzenes include branched-chain alkylbenzenes such as cumene, diisopropylbenzenes, t-butylbenzene, di-t-butylbenzenes, t-amylbenzene, di-t-amylbenzenes. These can be used singly as one species or in combination of two or more species.

Examples of cycloalkylbenzenes include a cycloalkylbenzene having a cycloalkyl group with 3 to 6 carbons; an alkylated cycloalkylbenzene in which at least one of the hydrogen atoms bonded to the carbon atoms constituting the cycloalkylbenzene is substituted with a linear or branched-chain alkyl group or a halogen atom (typically a fluorine atom); and a halogenated (typically fluorinated) cycloalkylbenzene. The number of carbons in the linear or branched-chain alkyl group is preferably 1 to 6 (e.g. 3 or 4). From the standpoint of generating gas (typically hydrogen gas), it is preferable that, in the alkylated cycloalkylbenzene, one or two of the hydrogen atoms bonded to the carbon atoms constituting the cycloalkylbenzene are substituted with alkyl group(s). For the same reason, it is preferable that, in the halogenated (typically fluorinated) cycloalkylbenzene, one or two of the hydrogen atoms bonded to the carbon atoms constituting the cycloalkylbenzene are substituted with fluorine atom(s).

Specific examples of cycloalkylbenzenes include cycloalkylbenzenes such as cyclopentylbenzene, cyclohexylbenzene (CHB), etc.; alkylated cycloalkylbenzenes such as t-butylcyclohexylbenzene, etc.; and partially fluorinated cycloalkylbenzenes such as cyclohexylfluorobenzene, etc. These can be used singly as one species or in combination of two or more species.

Examples of biphenyls include biphenyl (BP), an alkylbiphenyl in which at least one of the hydrogen atoms bonded to the carbon atoms constituting BP is substituted with a linear or branched-chain alkyl group or a halogen atom (typically a fluorine atom), and halogenated (typically fluorinated) biphenyls. The number of carbons in the linear or branched-chain alkyl group is preferably 1 to 6 (e.g. 3 or 4). From the standpoint of generating gas (typically hydrogen gas), it is preferable that, in the alkylbiphenyl, one or two of the hydrogen atoms bonded to the carbon atoms constituting the biphenyl are substituted with alkyl group(s). For the same reason, it is preferable that, in the halogenated (fluorinated) biphenyl, one or two of the hydrogen atoms bonded to the carbon atoms constituting the biphenyl are substituted with fluorine atom(s).

Specific examples of biphenyls include, besides BP, alkylbiphenyls such as propylbiphenyls, t-butylbiphenyls, etc.; and partially fluorinated biphenyls such as 2-fluorobiphenyl, 2,2'-difluorobiphenyl, 4,4'-difluorobiphenyl, etc. These can be used singly as one species or in combination of two species.

Examples of terphenyls, diphenyl ethers and dibenzofurans include terphenyl, diphenyl ether and dibenzofuran; their respective alkylated compounds (alkylated terphenyls, alkylated diphenyl ethers, alkylated dibenzofurans) and the respective halogenated (typically fluorinated) terphenyls, diphenyl ethers and dibenzofurans, in which at least one of the hydrogen atoms bonded to the carbon atoms constituting them is substituted with a linear or branched-chain alkyl group or a halogen atom (typically a fluorine atom). The number of carbons in the linear or branched-chain alkyl group is preferably 1 to 6 (e.g. 3 or 4). From the standpoint of generating gas (typically hydrogen gas), it is preferable that, in the alkylated terphenyl, alkylated diphenyl ether and alkylated dibenzofuran, one or two of the hydrogen atoms bonded to the carbon atoms constituting them are substituted with alkyl group(s). For the same reason, it is preferable that the halogenated (typically fluorinated) terphenyl, diphenyl ether and dibenzofuran are partial fluorination products of terphenyls, diphenyl ether and dibenzofuran, respectively, in which one or two of the hydrogen atoms bonded to the carbon atoms constituting them are substituted with fluorine atom(s). The terphenyl may be a partially hydrogenated terphenyl in which hydrogen atom(s) are added partially.

The amount of the overcharge-reactive compound used (added) is preferably about 0.01 to 10% by mass (e.g. 0.1 to 5% by mass, typically 1 to 3% by mass) in the non-aqueous electrolyte. The overcharge-reactive compound content in the non-aqueous electrolyte after overcharge-reactive multimers are formed by a reaction of the overcharge-reactive compound described later may be, for instance, about 1% by mass or lower (e.g. 0.5% by mass or lower, typically 0.001 to 0.3% by mass) since it is consumed in the reaction.

At or near the positive electrode in the lithium-ion secondary battery, overcharge-reactive multimers including dimers to higher-order multimers formed by polymerization of the overcharge-reactive compound is present in a significant amount, but this will be described later.

A method for producing a non-aqueous electrolyte secondary battery is described next. Such a production method for a secondary battery comprises, for instance, constructing a positive electrode, constructing a negative electrode, and constructing a non-aqueous electrolyte secondary battery with the positive electrode and the negative electrode. For constructing the positive electrode, the negative electrode and the non-aqueous electrolyte secondary battery, methods described earlier can be suitably employed. As a preferable example, a method for producing a lithium-ion secondary battery is described below.

The method disclosed herein for producing a lithium-ion secondary battery comprises allowing, at or near the positive electrode, an overcharge-reactive compound to undergo a reaction using a polymerization initiator. In other words, the reaction of the overcharge-reactive compound is carried out, not after the production of the lithium-ion secondary battery, but in the production stage. This allows overcharge-reactive multimers including dimers to higher-order multimers to be formed at or near the positive electrode. The overcharge-reactive multimers are less susceptible to modification or decomposition than the overcharge-reactive compound, whereby modification or decomposition of the component derived from the overcharge-reactive compound is prevented. The mechanism is described in detail. The polymerization reaction of the overcharge-reactive compound mainly takes place in two steps. In particular, in the first step (Step 1), the overcharge-reactive compound reacts (polymerizes) to produce overcharge-reactive multimers including dimers to higher-order multimers of the overcharge-reactive compound as intermediates. Subsequently, in the second step (Step 2), the overcharge-reactive multimers produced further react (polymerize) to produce a polymer. In Step 2, along with the polymerization, atoms forming a gaseous component are eliminated from the overcharge-reactive multimers, producing a large amount of gas. For instance, however, it is presumed that when the battery is used for a prolonged period or stored at high voltage, part of the overcharge-reactive compound undergoes modification or decomposition. Although some gas is produced during such modification or decomposition, it will not be enough to activate the current-interrupting device since the reaction is sluggish. It is presumed that due to the modification or decomposition, the amount of gas generated will decrease or the amount of the polymer produced will decrease when an overcharged state is reached. More specifically, it is considered that the modification or decomposition affects the Step 1 reaction in particular. If the progress of the Step 1 reaction is insufficient, the amount that undergoes the subsequent Step 2 reaction will also decrease, thereby making the gas generation or polymer production insufficient. To surely carry out the Step 1 reaction, the production method employs a technique where the reaction of the overcharge-reactive compound is allowed to progress through Step 1 in advance, using a polymerization initiator. This allows the overcharge-reactive compound to react (polymerize) to produce overcharge-reactive multimers relatively less susceptible to modification or decomposition. As a result, modification or decomposition of the component derived from the overcharge-reactive compound is prevented. By allowing the reaction to progress through Step 1 in advance, when an overcharged state is reached, the Step 2 reaction will readily proceed. As a result, it is possible to highly precisely and stably produce desirable effects obtainable by the reaction of the overcharge-reactive compound, such as generation of a necessary amount of gas and formation of a polymer. More specifically, the amount of gas generated or the amount of the polymer produced will be less likely to change over time, increasing the stability of the reaction. By this means, even if the battery is used over a prolonged period, it is expected to produce gas or the polymer in amounts equivalent to the initially expected amounts. The reaction to produce overcharge-reactive dimers to higher-order multimers of the overcharge-reactive compound (typically a reaction carried out through Step 1 and not allowed to progress to Step 2) can be carried out, by suitably selecting the type and amount of polymerization initiator described later in accordance with the type and amount of the overcharge-reactive compound used, or by suitably adjusting, as necessary, the conditions, etc., for heating treatment described later.

The lithium-ion secondary battery production method preferably comprises the following steps. The steps include obtaining a positive electrode comprising a polymerization initiator, obtaining a non-aqueous electrolyte comprising an overcharge-reactive compound, supplying the non-electrolyte to the positive electrode, polymerizing the overcharge-reactive compound so that overcharge-reactive multimers including dimers to higher-order multimers are formed at or near the positive electrode. This allows the reaction of the overcharge-reactive compound to progress through Step 1 in advance with the use of the polymerization initiator.

In the production method above, it is preferable to obtain a positive electrode comprising a polymerization initiator. Gas generation and polymer formation (membrane formation) due to the reaction (polymerization) of the overcharge-reactive compound take place at or near the positive electrode (typically on the surface thereof). Thus, by the inclusion of a polymerization initiator to initiate the reaction (polymerization) of the overcharge-reactive compound in the positive electrode (typically in the positive electrode material layer), the polymer of the overcharge-reactive compound can be efficiently formed at or near the positive electrode (typically on the surface thereof). More specifically, the polymerization initiator is preferably added to a positive electrode material layer-forming composition while the positive electrode (typically a positive electrode material layer) is being fabricated. This allows the reaction of the overcharge-reactive compound to progress through Step 1 in advance.

While the polymerization initiator is not particularly limited, radical polymerization initiators are preferable since the reaction (typically the Step 1 reaction) of the overcharge-reactive compound can be easily controlled. Examples of radical polymerization initiators include azo-based polymerization initiators, peroxide-based polymerization initiators, and persulfate-based polymerization initiators. In particular, azo-based polymerization initiators are preferable.

Examples of azo-based polymerization initiators include 2,2'-azobis(2-amidinopropane)dihydrochloride, 2,2'-azobis[N-(2-carboxyethyl)-2-methylpropionamidine]hydrate, 2,2'-azobisisobutyronitrile, 2,2'-azobis-2-methylbutyronitrile, 2,2'-azobis(2-methylpropionamidine)disulfate, 2,2'-azobis[2-(5-methyl-2-imidazolin-2-yl)propane]dihydrochloride, 2,2'-azobis(N,N'-dimethyleneisobutylamidine)dihydrochloride and the like. These can be used singly as one species or in combination of two or more species. In particular, 2,2'-azobisisobutyronitrile and 2,2'-azobis-2-methylbutyronitrile are preferable.

Examples of peroxide-based polymerization initiators include benzoyl peroxide, acetyl peroxide, methyl ethyl ketone peroxide, cyclohexanone peroxide, cumene hydroperoxide, t-butyl hydroperoxide, hydrogen peroxide, di-tert-butyl peroxide, dicumyl peroxide, and dilauroyl peroxide. These can be used singly as one species or as a mixture of two or more species. In particular, benzoyl peroxide, t-butyl hydroperoxide, hydrogen peroxide and dicumyl peroxide are preferable.

Examples of persulfate-based polymerization initiators include ammonium persulfate, sodium persulfate and potassium persulfate. These can be used singly as one species or as a mixture of two or more species.

The amount of polymerization initiator used is not particularly limited. A suitable amount can be selected according to the intended purpose of the overcharge-reactive compound, the type and amount used of the overcharge-reactive compound, polymerization conditions, and so on. When a polymerization initiator is added to the positive electrode material layer, for the overcharge-reactive multimers to be formed at or near the positive electrode, it is preferably added in an amount of about 10 ppm to 5000 ppm (e.g. 50 ppm to 3000 ppm, typically 100 ppm to 1000 ppm) by mass in the positive electrode material layer (non-volatiles in the positive electrode material layer-forming composition). When using a cyclobenzene and/or a biphenyl as the overcharge-reactive compound and an azo-based polymerization initiator as the polymerization initiator, it is particularly preferable to be at 100 ppm to 1000 ppm. It is noted that the polymerization initiator may not be entirely consumed depending on the reaction of the overcharge-reactive compound and a fraction that does not contribute to the reaction may remain in the positive electrode (typically in the positive electrode material layer). Thus, the positive electrode after the reaction may comprise the polymerization initiator.

In the production method, it is preferable to obtain a non-aqueous electrolyte comprising an overcharge-reactive compound. For the overcharge-reactive compound and non-aqueous electrolyte, suitable ones can be selected and used among those described earlier. It is also preferable that the amount used (added) of the overcharge-reactive compound is within the aforementioned range.

It is preferable to then supply the non-aqueous electrolyte to the positive electrode. In a preferable example, an electrode body comprising a positive electrode and a negative electrode is fabricated by a method described earlier, and after the electrode body is placed in a case, a non-electrolyte comprising an overcharge-reactive compound is poured into the case. This allows contacts between the polymerization initiator and the overcharge-reactive compound at or near the positive electrode.

After the non-aqueous electrolyte is supplied to the positive electrode, the overcharge-reactive compound is allowed to undergo a reaction (polymerization). By the reaction (polymerization), overcharge-reactive multimers including dimers to higher-order multimers are formed at or near the positive electrode. The overcharge-reactive multimers including dimers to higher-order multimers are typically intermediates formed when the reaction has progressed through the Step 1 reaction, but has not reached Step 2. Thus, the overcharge-reactive multimers have a relatively low degree of polymerization, thereby having relatively a high activity (reactivity) to a level where polymerization will progress further when an overcharged state is reached. For example, when CHB and/or BP is used as the overcharge-reactive compound, by the Step 1 reaction, multimers including dimers such as 2,2'-dicyclohexylbiphenyl, 4,4'-dicyclohexylbiphenyl, etc., are formed as the overcharge-reactive multimers. It is noted that cyclohexylbenzenes (typically CHB) and biphenyls (typically BP) may be interconverted to each other in the non-aqueous solvent when the battery is in use. When such formation reactions occur, a small amount of gas may be produced. However, it will not be usually enough to activate a current-interrupting device in a sealed battery comprising the current-interrupting device. To surely avoid the activation, the reaction is preferably carried out while the valve (a valve for opening and closing a passage communicating the inside and the outside of the battery) constituting the sealed battery is open (typically before the battery is sealed).

When the overcharge-reactive multimers including dimers to higher-order multimers have an excessively high degree of polymerization, they will make resistors in the battery under normal use conditions. A sufficient amount of gas may be less likely produced in the Step 2 reaction. For example, it is considered that the polymer formed when an overcharged state is reached has a degree of polymerization of about 100 or higher. It is preferable to suppress the degree of polymerization (average degree of polymerization) of the overcharge-reactive multimers to about 50 or lower (e.g. 30 or lower, typically 2 to 10). Herein, for the degree of polymerization, the overcharge-reactive compound being the starting material (a substance added to the non-aqueous electrolyte) is counted as a single unit. In other words, the overcharge-reactive multimers are preferably 50-mers or lower-order multimers (e.g. 30-mers or lower-order multimers, typically dimers to 15-mers) of the overcharge-reactive compound. The amount of dimers to decamers (more preferably dimers to pentamers) of the overcharge-reactive compound is preferably 50% by mass or higher (e.g. 70% by mass or higher, typically 95% by mass or higher) in the overcharge-reactive multimers. The degree of polymerization of the overcharge-reactive multimers can be adjusted by suitably selecting the type and amount of polymerization initiator according to the type and amount of the overcharge-reactive compound used, or by suitably adjusting the conditions for the heating treatment described later, etc., as necessary. The degree of polymerization can be measured based on the molecular weight determined by a known technique such as a gas chromatography/mass spectrometry method (GC/MS method), gel permeation chromatography (GPC), etc.

After the non-aqueous electrolyte is supplied to the positive electrode, it is preferable to heat the non-aqueous electrolyte supplied. This allows for preferable control of the reaction (polymerization) of the overcharge-reactive compound. Typically, more preferable control is possible such that the reaction is allowed to progress through Step 1, but not to Step 2. With respect to the heating temperature, a suitable range can be set according to the types and amounts of overcharge-reactive compound and polymerization initiator used. For example, the heating temperature is preferably 50° C. to 100° C. (e.g. 60° C. to 90° C., typically 70° C. to 80° C.). In particular, when an azo-based polymerization initiator is used as the polymerization initiator, this temperature range can be preferably applied. The heating time can be suitably selected according to the heating temperature, etc. For example, it is preferably about 2 hours or more, but 20 hours or less (e.g. 3 hours or more, but 15 hours or less, typically 5 hours or more, but 12 hours or less). The heating treatment may also be referred to as aging treatment.

By allowing the overcharge-reactive compound to undergo the reaction (polymerization) in such a way, it is possible to obtain a constitution such that, at or near the positive electrode constituting the lithium-ion secondary battery, overcharge-reactive multimers including dimers to higher-order multimers formed by polymerization of the overcharge-reactive compound are present in a larger amount by mole than the overcharge-reactive compound remaining unpolymerized. More specifically, it is possible to obtain a constitution in which the overcharge-reactive multimers are dissolved near the positive electrode or a constitution in which the multimers have precipitated on the positive electrode surface. The overcharge-reactive compound remaining unpolymerized refers to the overcharge-reactive compound that has not undergone the Step 1 reaction (polymerization). Thus, the constitution in which the overcharge-reactive multimers are present in a larger amount by mole than the overcharge-reactive compound remaining unpolymerized may include a state where the overcharge-reactive multimers and the overcharge-reactive compound co-exist at or near the positive electrode while the overcharge-reactive multimers are predominant by mole over the overcharge-reactive compound. Having this constitution prevents modification or decomposition of the overcharge-reactive compound. Also, when an overcharged state is reached, the Step 2 reaction readily progresses.

Figure 3:
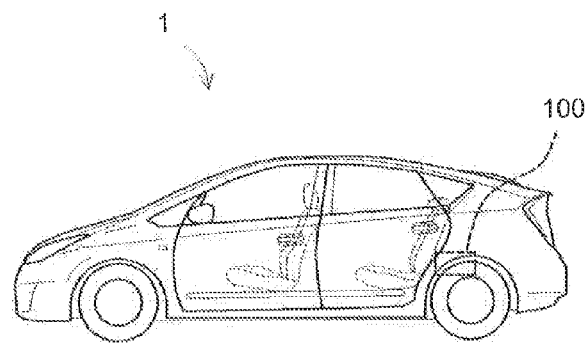
FIG. 3 shows a perspective view schematically illustrating a vehicle (automobile) comprising a lithium-ion secondary battery according to an embodiment.

A lithium-ion secondary battery thus constructed, that is, a lithium-ion secondary battery in which overcharge-reactive multimers are present at or near the positive electrode in a larger amount by mole than the unpolymerized overcharge-reactive compound, is used as a battery for various intended uses. Such a lithium-ion secondary battery can precisely produce a sufficient amount of gas when an overcharged state is reached; and therefore, when used as a battery comprising a current-interrupting device, activation of the current-interrupting device can be controlled more preferably. Moreover, since the polymer derived from the overcharge-reactive compound can be precipitated in a sufficient amount on the positive electrode surface, a further overcharge is prevented, increasing the safety in an overcharged state. Thus, such a lithium-ion secondary battery can be preferably used as a power supply for a motor (electric motor) loaded especially on vehicles such as automobiles and the like. Accordingly, as shown in FIG. 3, the present invention provides a vehicle 1 (typically an automobile, especially an automobile comprising an electric motor, such as hybrid automobiles, electric automobiles, fuel-cell automobiles) comprising such a lithium-ion secondary battery 100 (typically a multi-battery system obtainable by serially connecting several batteries) as a power supply.

Several embodiments relevant to the present invention are described below although this is not to limit the present invention to these worked examples. In the following description, the terms "parts" and "%" are based on the mass unless specifically stated otherwise.

Example 1 to Example 8

(1) Fabrication of Positive Electrode Sheet

Lithium nickel manganese cobalt oxide (Li[Ni$_{1/3}$Mn$_{1/3}$Co$_{1/3}$]O$_2$) powder as a positive electrode active material, acetylene black as a conductive material and polyvinylidene fluoride as a binder were mixed at a mass ratio of these materials of 91:6:3 with N-methyl-2-pyrrolidone. To this, 2,2'-azobisisobutylonitrile (AIBN) as a polymerization initiator was added and mixed in an amount as shown in Table 1 to prepare a pasty positive electrode material layer-forming composition at a non-volatile concentration of about 50% by mass. The composition was evenly applied to a face of a long sheet of aluminum foil (15 μm thick) and allowed to dry to form a positive electrode material layer on the positive current collector, whereby a sheet of positive electrode (positive electrode sheet) was fabricated.

(2) Fabrication of Negative Electrode Sheet

Natural graphite powder as a negative electrode active material, a styrene-butadiene copolymer as a binder and carboxymethyl cellulose as a thickener were mixed at a mass ratio of these materials of 98:1:1 with ion-exchanged water to prepare a pasty negative electrode material layer-forming composition at a non-volatile concentration of about 50% by mass. The composition was evenly applied to a face of a long sheet of copper foil (10 μm thick) and allowed to dry to form a negative electrode material layer on the negative current collector, whereby a sheet of negative electrode (negative electrode sheet) was fabricated.

(3) Construction of Lithium-Ion Secondary Battery

The fabricated positive electrode sheet and negative electrode sheet were cut into 70 mm by 30 mm in size and layered so that these material layers faced each other via a separator, whereby an electrode body was fabricated. As the separator, a 25 μm thick porous polyethylene sheet was used. After the electrode body was placed along with a non-aqueous electrolyte solution in laminated film and closed (sealed) therein, whereby a laminated lithium-ion secondary battery was fabricated. As the non-aqueous electrolyte solution, was used an electrolyte solution prepared by dissolving about 1 mol/L of LiPF$_6$ as a supporting salt in a solvent mixture consisting of ethylene carbonate (EC), dimethyl carbonate (DMC) and ethyl methyl carbonate (EMC) at 3:3:4 (volume ratio) and further adding cyclohexylbenzene (CHB) at a concentration of about 2% by mass. The lithium-ion secondary battery was subjected to a suitable conditioning treatment (an initial charging/discharging treatment involving two to three cycles of three hours of constant-current charging at a charge rate of 1/10 C followed by constant-current constant-voltage charging at a charge rate of 1/3 C to 4.1 V and constant-current discharging at a discharge rate of 1/3 C to 3.0 V) and then to an aging treatment at 80° C. for 10 hours. Lithium-ion secondary batteries according to Example 1 to Example 8 were thus obtained.

[Measurement of Amount of Gas Generated Inside Battery Cell]

Volumes of the respective lithium-ion secondary batteries according to Example 1 to Example 8 were measured by the Archimedes method. The Archimedes method determines the volume of an object by immersing the object (in these examples, laminated lithium-ion secondary batteries) in a fluid medium (e.g. distilled water, alcohols, etc.) and measuring the buoyancy force exerted on the object. After the measurements, the lithium-ion secondary batteries were charged to overcharged states (to 4.9 V in this example) and their volumes were measured again by the Archimedes method. By subtracting the cell volume before overcharging from the cell volume after overcharging, the amount of gas generated upon overcharging was determined. The amounts of gas generated upon overcharging are expressed as relative values, with the amount of gas generated with Example 1 being 1.00. The larger the value, the larger the amount of gas generated. The results are shown in Table 1 and FIG. 4.

[IV Resistance Test]

The lithium-ion secondary batteries according to Example 1 to Example 8 were subjected to an IV resistance test. In particular, in an atmosphere at room temperature (around 25° C.), each battery was CC-charged at a constant current of 1 C to 3.5 V and then CV-charged at the same voltage for a combined time of two hours. Subsequently, at 25° C., it was discharged at a current of 10 C for 10 seconds and the IV resistance was determined from the voltage drop at 10 seconds after the start of discharge. The IV resistance is expressed as relative values, with the resistance value of Example 1 being 1.00. The larger the value, the higher the IV resistance. The results are shown in Table 1 and FIG. 4.

TABLE 1

| | Amount of polymerization initiator added (ppm) | Amount of gas generated upon overcharging (relative values) | IV Resistance (relative values) |
|---|---|---|---|
| Ex. 1 | 0 | 1.00 | 1.00 |
| Ex. 2 | 100 | 1.12 | 0.98 |
| Ex. 3 | 300 | 1.15 | 1.01 |
| Ex. 4 | 500 | 1.16 | 1.02 |
| Ex. 5 | 700 | 1.13 | 1.15 |
| Ex. 6 | 1000 | 1.15 | 1.17 |
| Ex. 7 | 1200 | 0.80 | 1.22 |
| Ex. 8 | 1500 | 0.60 | 1.26 |

Figure 4:
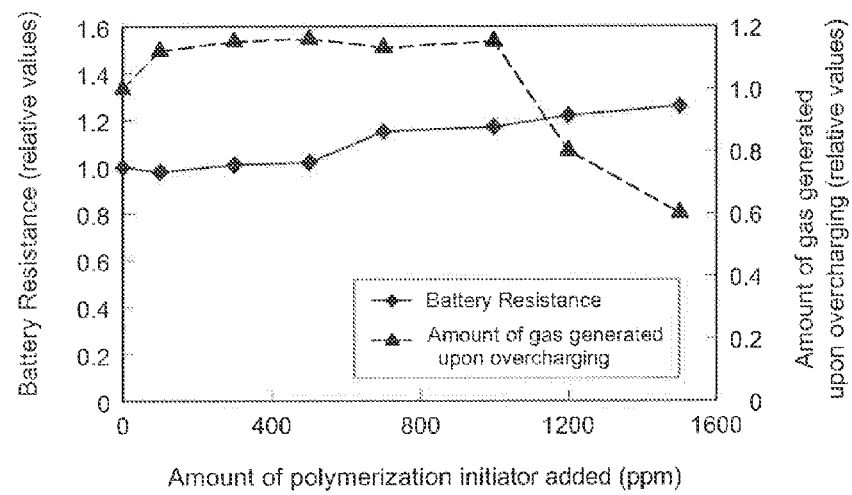
FIG. 4 shows a graph indicating the relationships of the amount (ppm) of polymerization initiator added in a positive electrode material layer versus the amount of gas generated when overcharged and versus the battery resistance.

As shown in Table 1 and FIG. 4, with increasing amount of polymerization initiator added, the battery resistance increased. With respect to the lithium-ion secondary batteries according to Example 2 to Example 6 where the amounts of polymerization initiator added were 100 ppm to 1000 ppm, it can be seen that the amounts of gas generated upon overcharging increased. It is considered that multimers of CHB were preferably formed and many dimers to decamers of CHB were present near the positive electrodes or on the surfaces thereof. On the other hand, with respect to Example 7 and Example 8 where the amounts of polymerization initiator added were 1200 ppm or more, the amounts of gas generated were lower than that of Example 1 where no polymerization initiator was used. While the reason is unknown, for one reason, it is presumed that when excess polymerization initiator is used, some polymerization initiator dissolves into the non-aqueous electrolyte solution and overcharge-reactive multimers are formed outside the vicinity of the positive electrode, making these multimers unavailable for gas generation. Since CHB can convert to BP in the non-aqueous electrolyte solution, it is expected that the same effects can be obtained also with biphenyls. From the above, it can be seen that in a constitution that uses CHB as the overcharge-reactive compound and AIBN as the polymerization initiator and is subjected to a prescribed aging treatment, the amount of AIBN added is desirably 100 ppm to 1000 ppm. With respect to a constitution using a compound other than CHB as the overcharge-reactive compound or a compound other than AIBN for the polymerization initiator, because the amount range of polymerization initiator added may change, it is not limited to the amount added in the worked examples, but rather, a suitable amount can be selected for addition. When an aging treatment is performed, depending on the conditions, the preferable amount range of polymerization initiator added may vary.

Although specific embodiments of the present invention have been described in detail above, these are merely for illustrations and do not limit the scope of the claims. The art according to the claims includes various modifications and changes made to the specific embodiments illustrated above.

The invention claimed is:

1. A non-aqueous electrolyte secondary battery comprising:
   a positive electrode;
   a negative electrode;
   a non-aqueous electrolyte solution comprising a non-aqueous solvent and a supporting salt;
   a case to house the positive electrode, the negative electrode and the non-aqueous electrolyte solution;
   a conduction pathway formed to allow conduction between at least one of the electrodes and an outer terminal exposed outside the case;
   a current-interrupting device to cut off the conduction pathway at a predetermined increase in the internal pressure of the case;
   an overcharge-reactive compound; and
   overcharge-reactive multimers including dimers to higher-order multimers formed by polymerization of the overcharge-reactive compound, wherein
   the overcharge-reactive multimers are present in a larger amount by mole than the overcharge-reactive compound remaining unpolymerized at or near the positive electrode, and
   the current-interrupting device is activated and cuts off the conduction pathway by gas generated by the reaction of the overcharge-reactive compound and the overcharge-reactive multimers when an overcharged state is reached.

2. The non-aqueous electrolyte secondary battery according to claim 1, wherein the overcharge-reactive multimers primarily comprise dimers to decamers of the overcharge-reactive compound.

3. The non-aqueous electrolyte secondary battery according to claim 1, wherein the positive electrode comprises a polymerization initiator.

4. The non-aqueous electrolyte secondary battery according to claim 3, wherein the polymerization initiator is an azo-based polymerization initiator.

5. The non-aqueous electrolyte secondary battery according to claim 1, wherein the overcharge-reactive compound is at least one species selected from a group consisting of branched-chain alkylbenzenes, cycloalkylbenzenes, biphenyls, terphenyls, diphenyl ethers and dibenzofurans.

6. A method for producing a non-aqueous electrolyte secondary battery, the method comprising:
   obtaining a positive electrode comprising a positive electrode material layer and a polymerization initiator, wherein the polymerization initiator is added in an amount of 100 ppm to 1000 ppm by mass in the positive electrode material layer,
   obtaining a negative electrode comprising a negative electrode material layer,
   obtaining a non-aqueous electrolyte solution comprising a non-aqueous solvent, a supporting salt and an overcharge-reactive compound,
   obtaining a case to house the positive electrode, the negative electrode and the non-aqueous electrolyte solution,
   constructing a current-interrupting device to cut off a conduction pathway allowing conduction between at least one of the positive electrode and the negative electrode and an outer terminal exposed outside the case when the internal pressure of the case is increased to a predetermined level, supplying the non-aqueous electrolyte solution to the positive electrode, and polymerizing the overcharge-reactive compound to form overcharge-reactive multimers including dimers to higher-order multimers at or near the positive electrode.

7. The method according to claim 6, wherein the overcharge-reactive multimers primarily comprise dimers to decamers of the overcharge-reactive compound.

8. The method according to claim 6, wherein after the non-aqueous electrolyte solution is supplied to the positive electrode, the non-aqueous electrolyte solution supplied is heated at a temperature of 50° C. to 100° C. to polymerize the overcharge-reactive compound.

9. The method according to claim 6, wherein as the polymerization initiator, an azo-based polymerization initiator is used.

10. The method according to claim 6, using, as the overcharge-reactive compound, at least one species selected from a group consisting of branched-chain alkylbenzenes, cycloalkylbenzenes, biphenyls, terphenyls, diphenyl ethers and dibenzofurans.

11. A vehicle comprising the non-aqueous electrolyte secondary battery according to claim 1.

\* \* \* \* \*